Patented June 24, 1952

2,601,223

UNITED STATES PATENT OFFICE 2,601,223

PREPARATION OF DIBASIC CARBOXYLIC ACIDS

Milton J. Roedel, Wilmington, Del., assignor to E. I. du Pont de Nemours and Company, Wilmington, Del., a corporation of Delaware No Drawing. Application January 5, 1951,
Serial No. 204,681

18 Claims. (Cl. 260—537)

This invention relates to the synthesis of long-chain dibasic acids. More particularly, the invention relates to an improved simple method for the preparation of long-chain aliphatic dibasic acids containing eight or more carbon atoms.

The present application is a continuation-in-part of S. N. 186,103, filed September 21, 1950, now abandoned.

Long-chain dibasic acids are known to the prior art and find important uses in the preparation of monomeric and polymeric plasticizers, fine chemicals and condensation polymers, particularly alkyds for finishes and laminating resins, and linear polyesters and polyamides for fiber, film and plastic applications. These long-chain dibasic acids, however, can only be synthesized by costly methods, and consequently their use has been limited. The purpose of this invention is to provide new and more economical methods for their preparation.

In accordance with this invention, long-chain dibasic acids are prepared in one step by treating, under redox conditions, a compound having a cyclic structure containing from 4 to 10 carbon atoms in the primary ring and having a peroxide grouping attached directly to one of the carbon atoms of said structure. These compounds may be defined as peroxides of the type obtainable by reacting together hydrogen peroxide and a cyclic ketone of the formula

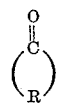

where R is a divalent radical containing from 3 to 9 carbon atoms in the unsubstituted portion of the diradical. This reaction may be carried out as described by Milas in U. S. 2,298,405. These same compounds may also be prepared by other methods, as for instance by treating a suitable cyclic secondary alcohol, such as cyclohexanol or cyclopentanol, with molecular oxygen, preferably in the presence of a free radical initiator. For example, cyclohexanol can be treated with molecular oxygen. This may be done at 60° to 85° C. using an azonitrile catalyst and added calcium carbonate, or it may be done in the presence of ultraviolet light with or without the addition of benzoin or a photoinitiator. Cyclopentanol, for example, may be treated with molecular oxygen in the presence of an azonitrile catalyst or in the presence of ultraviolet light and calcium carbonate, with or without the addition of benzoin.

In a particular and preferred embodiment of the invention, a peroxide compound derivable from the reaction of cyclopentanone and hydrogen peroxide is treated under redox conditions to produce sebacic acid in one step.

In another particular and preferred embodiment of the invention, a peroxide compound derivable from the reaction of cyclohexanone and hydrogen peroxide is treated under redox conditions to produce dodecanedioic acid in one step.

Several different structures have been attributed to the reaction products of cyclic ketones with hydrogen peroxide, among which the following formulas should be mentioned:

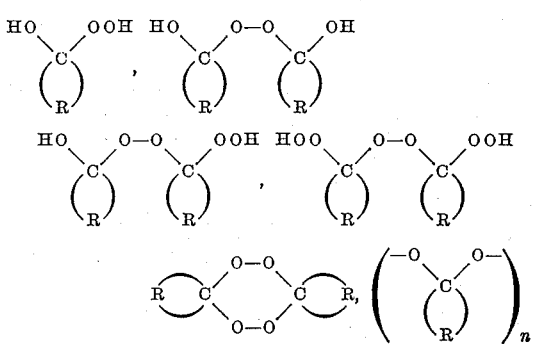

and

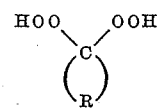

The third formula given above, of which 1-hydroxy-1'-hydroperoxydicyclohexyl peroxide is an example, is believed to be the most likely formula for the main product formed. Certain of the compounds represented by these formulas may be in equilibrium with each other, with the relative proportions of each being dependent upon the addition or subtraction of water and/or hydrogen peroxide.

In the above formulas, the divalent radical R may consist of unsubstituted methylene groups or it may contain one or more substituents of the group consisting of methyl, ethyl, propyl, butyl, benzyl, phenyl, cyclohexyl, chloro, fluoro, hydroxy, methoxy, carboxy, carbalkoxy and keto. Alternately, the divalent radical R may contain one or more non-aromatic double bonds, or a phenyl or cyclohexyl substituent, for instance, may form a part of the primary ring structure.

Examples of various suitable divalent radicals include, for instance,

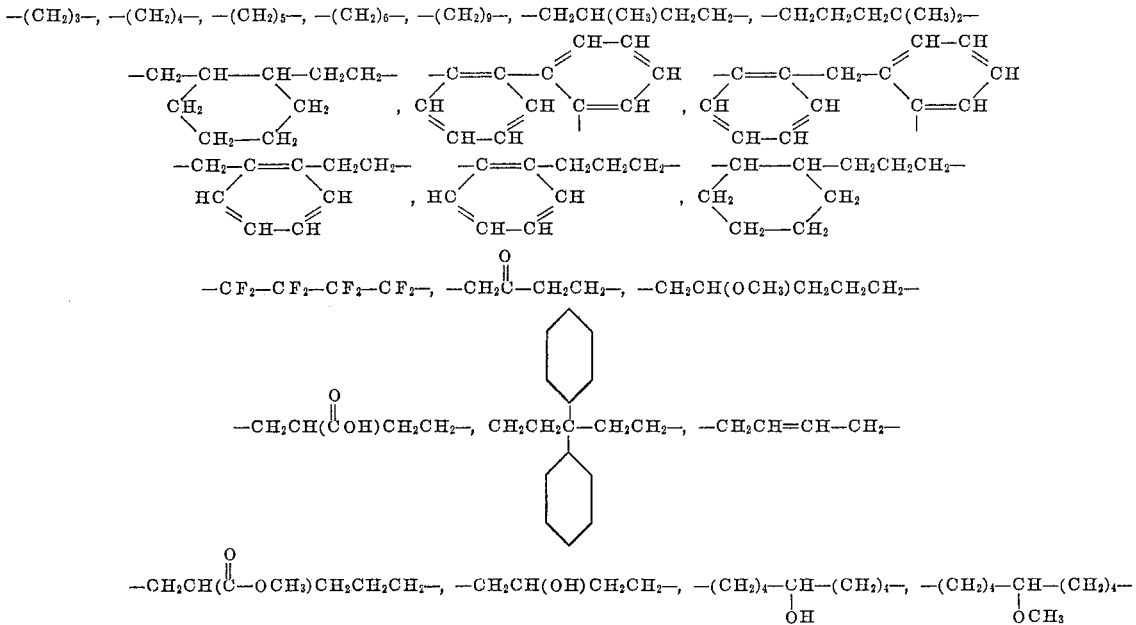

and like structures.

The term "peroxide compound" is frequently used herein in a broad sense to describe compounds having formulas of the type set forth above, i. e., this term encompasses compounds which in a strict sense are defined as hydroperoxides.

The preferred starting materials are the peroxides of the type obtainable by reacting hydrogen peroxide with cyclopentanone and cyclohexanone (where $R=(CH_2)_4$ and $(CH_2)_5$, respectively), because these compounds are easily obtained and, upon treatment in accordance with the process of this invention, they yield highly valuable unsubstituted straight-chain dibasic acids.

The use of redox conditions is essential to convert these peroxide compounds to dibasic acids. The term "redox" is used in its accepted sense to denote an oxidation-reduction reaction in which an electron transfer occurs with the simultaneous formation of a free radical. In order for this free radical formation to occur, there must be present a substance which acts as a reducing agent for the peroxide compound. Suitable reducing agents are the heavy metals capable of existing in several valence states, such as iron, cobalt, manganese, copper, chromium and the like, as well as 1-ascorbic acid, sodium formaldehyde sulfoxylate, sodium bisulfite, the reducing sugars, and other reducing agents common to the redox art. When employing a heavy metal alone, one would use an amount of ferrous ion, for instance, which is equivalent to, or in excess of, the amount of peroxide compound which is to be converted.

In place of equivalent or excess amounts of ferrous ion, however, one can use traces of a multi-valent metal such as ferrous or ferric ion, for instance, together with another of the above-mentioned reducing agents, which serve to convert the ferric ion to ferrous ion as fast as the ferric ion is formed. In this type of process, the heavy metal may be thought of as a promoter. Ferrous ion is preferred as such, or as the promoter, because of its efficiency and low cost.

In this connection, it is of great importance, in order to obtain satisfactory yields, that the reaction mixture be substantially free of oxygen, since oxygen inhibits the dimerization step until it has been used up, thus decreasing the yield of dibasic acid.

The conversion of the cyclic peroxide compounds to long-chain carboxylic acids can be carried out in water, solvents or emulsions, at atmospheric pressure and at temperatures in the range of $-100°$ C. to $100°$ C. or higher, although it is economical to carry out the reaction at room temperature in most cases. Common organic solvents such as methanol, ethanol, tertiary butanol, benzene, diethyl ether, methyl acetate, acetone, dioxane, and the like may be employed advantageously, together with water if desired. According to a greatly preferred embodiment of the invention, the reaction is carried out in the presence of a common solvent, i. e., a substance which is a solvent for both the peroxide compound and also the ferrous compound or other reducing agent. The reason for using a common solvent is that it makes possible the rapid mixing of the ingredients, which, in turn, promotes the desired reaction to produce dibasic acids and minimizes undesirable side reactions which tend to occur when the mixing is not rapid. These undesired side reactions are believed to involve induced decomposition of the peroxide or reaction of a free radical with $Fe^{2+}$ or $Fe^{3+}$, and apparently lead to the formation of undimerized products. Methanol is particularly preferred as the common solvent when ferrous ion is being employed as the reducing agent. If different immiscible solvents are employed for the two reactants, the use of a dispersing agent may be advantageous in bringing about rapid mixing.

Pressures which are higher or lower than atmospheric may be employed if desired. Under certain circumstances, it may be advantageous to operate at autogenous pressures, or at higher superatmospheric pressure, as for example, where it is desired to maintain a relatively volatile solvent in the liquid phase.

The reaction may be carried out under basic, neutral, or acidic conditions, and it may be carried out batchwise, semi-continuously, or continuously. For several reasons, a continuous process is very much preferred. In the first place, as pointed out above, rapid addition or mixing of the reactants is important in causing the reaction to take the desired course, and this rapid mixing can best be achieved in a continuous process. Secondly, from the point of view of safety, a continuous process minimizes the amount of undecomposed peroxide which is present within the synthesis equipment at a given moment. Some members of the series of peroxide compounds are highly explosive and very sensitive to shock, and accordingly every caution must be observed in handling them.

The continuous process is best carried out in a tubular reactor, preferably of small diameter, with approximately equivalent amounts of the peroxide compound and the ferrous reducing agent being mixed together as rapidly as possible under conditions of turbulent flow. The use of a common solvent greatly facilitates this rapid mixing under turbulent conditions. The temperature of the tubular reactor can be adjusted to the desired level by known methods. The length of the reactor will, of course, be dependent upon the rate of reaction of the particular peroxide compound under the conditions selected and the rate of flow.

Even though rapid mixing of the reactants is not employed, it is possible to obtain excellent yields provided the reducing agent is always present in excess. For example, when the peroxide is being added to the reducing agent, the addition can be carried out rather slowly and still give satisfactory results, because in this way an excess of reducing agent is maintained throughout.

The dibasic carboxylic acids prepared by this invention can readily be separated from the reaction mixture by conventional methods such as in the form of their salts, by distillation, by ion exchange techniques, by extraction, by adsorption and the like. In particular, the ferric ion can be removed by ion exchange as such, or by reduction first to the ferrous ion, and recycled in the process. The separation of the dibasic acids from the crude reaction mixtures may, of course, involve several steps and/or the formation of intermediate compounds such as the salts, for instance, before the acid itself is isolated in relatively pure form. Use of an alkyl ether derivative of the peroxide compounds, in place of the peroxide compound itself, gives the diester, under redox conditions, which can be readily purified by distillation and hydrolyzed to the free acid. The cyclic ether peroxides can be prepared by the low-temperature oxidation of a cyclic secondary ether,

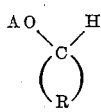

with oxygen, preferably in the presence of free radicals. In the foregoing formula, A represents a simple alkyl group such as methyl, ethyl, butyl, octyl, etc. Likewise the dibasic acid formed in the methanol solution under redox conditions can be esterified with methanol, for instance, and separated and purified by distillation as the dimethyl diester.

Further details of this invention are set forth in the following examples, which are intended to illustrate, but not to restrict, the scope of this invention.

*Example 1.*—Five grams of peroxide derived from cyclohexanone and hydrogen peroxide were dissolved in 100 ml. oxygen-free methanol under nitrogen and cooled to −30° C. Ten grams of ferrous sulfate heptahydrate were dissolved in 100 ml. oxygen-free methanol under nitrogen and cooled to −30° C. The peroxide solution was then poured into the ferrous sulfate solution. The temperature immediately rose to −10° C. and the solution turned reddish brown in color. The solution was evaporated to near dryness on a steam bath and 50 ml. of 30 per cent sodium hydroxide and 150 ml. of water were added and the mixture warmed. The hot solution was then filtered and made acidic with hydrochloric acid. A white precipitate formed which was filtered off, washed with water and dried. Weight=2.3 grams or fifty-three per cent conversion to dibasic acid. Melting point=123° C. The product was recrystallized from hot water and identified by its melting point of 125° C. and its neutral equivalent of 114.8 as dodecanedioic acid

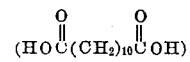

*Example 2.*—1.32 grams of peroxide derived from cyclopentanone and hydrogen peroxide and consisting mainly of 1-hydroxy-1'-hydroperoxy-dicyclopentyl peroxide, were dissolved in 50 ml. of oxygen-free methanol and mixed under nitrogen with 3.0 grams of ferrous sulfate heptahydrate in 60 ml. oxygen-free methanol at 10° C. The temperature rose to 20° C. and a flocculent, red precipitate formed. This precipitate was filtered and the red methanol solution evaporated to dryness with a stream of air. A deep red residue remained. This was taken up in six normal sodium hydroxide solution and stirred to break it up. Filtration gave a black precipitate and a tan filtrate. Acidification of the alkaline filtrate gave a light green precipitate. The light green precipitate was filtered after reducing the aqueous volume with a stream of air. It was recrystallized from hot water in the presence of a trace of carbon black. After drying, it weighed 0.60 grams, representing 54 per cent conversion to sebacic acid. A mixed melting point with a sample of sebacic acid, derived from castor oil by a caustic fusion process, was not depressed.

*Example 3.*—Five grams of peroxide derived from cyclohexanone and hydrogen peroxide were dissolved in 100 ml. of oxygen-free methanol and mixed with 10 grams of ferrous sulfate heptahydrate dissolved in 100 ml. of oxygen-free methanol. Rapid mixing took place at 23° C. under nitrogen. Reaction was instantaneous and the temperature rose to 43° C., the solution turned brown and a copious precipitate formed. The precipitate was filtered off, dissolved in dilute alkali, filtered to remove the ferric hydroxide and reprecipitated with hydrochloric acid. The white crystalline precipitate of dodecanedioic acid was then filtered off and air-dried. The conversion was 32 per cent.

*Example 4.*—13.2 grams of peroxide derived from cyclohexanone and hydrogen peroxide were added to a cold solution of 4.4 grams of sodium hydroxide in 100 ml. water and 27.8 grams of ferrous sulfate heptahydrate in 200 ml. water was added to it. The temperature rose from 26° C. to 39° C. and a brown precipitate formed. The mixture was made alkaline with 30 per cent sodium hydroxide and heated in the steam bath. The mixture was filtered and the filtrate made acid with hydrochloric acid. The precipitate that formed was filtered off and washed well with water. Yield=1.2 grams of dodecanedioic acid, which was identified by its melting point of 124° C. after recrystallization from hot water.

*Example 5.*—Cyclohexanone peroxide (derived from cyclohexanone and hydrogen peroxide) (13.2 grams) was dissolved in 100 ml. oxygen-free methanol under nitrogen and cooled to 0° C. and added to 17.6 grams of l-ascorbic acid plus 0.28 gram of ferrous sulfate heptahydrate dissolved in 200 ml. oxygen-free methanol under nitrogen and cooled to 0° C. The temperature rose from 0° C. to 43° C. The methanol was evaporated off and 200 ml. water added. The precipitate was filtered off and washed well with water. Yield=2.2 grams of dodecanedioic acid.

*Example 6.*—Cyclopentanone peroxide (0.7 gram) was dissolved in 95 ml. of methanol, cooled to −60° C., and added to 1.2 grams of ferrous chloride tetrahydrate dissolved in 10 ml. of methanol cooled to −60° C. Reaction occurred immediately as noted by color change and the solution was placed in an evaporating dish and the methanol evaporated off. Then 1.2 grams of sodium hydroxide in 25 ml. of water was added and the mixture broken up and warmed on the steam bath. The hot solution was filtered to remove the iron and made acid with 5 cc. of concentrated hydrochloric acid. The white, crystalline precipitate that formed was filtered off, washed with water and dried. This product was identified as sebacic acid by its melting point and the fact that a mixed melting point with an authentic sample of sebacic acid was not depressed.

*Example 7.*—To a solution of 12 grams of sodium formaldehyde sulfoxylate dihydrate plus 0.22 gram of ferrous sulfate heptahydrate plus 1 gram of sodium lauryl sulfate dispersing agent plus 3 grams of sodium dihydrogen phosphate monohydrate plus 300 ml. of oxygen-free water under an atmosphere of nitrogen was added 10 grams of cyclohexanone peroxide in 100 ml. of benzene. As stirring began at room temperature and emulsification took place, the temperature rose to 40° C. and then gradually subsided. After one hour of stirring, the mixture was treated with sodium chloride to break the emulsion and the water layer, which showed a pH between 4 and 5, was discarded. Evaporation of the benzene layer gave an alkali-soluble product which was identified by its melting point as dodecanedioic acid.

*Example 8.*—Four grams of cyclohexanone peroxide consisting mainly of 1-hydroxy-1′-hydroperoxydicyclohexyl peroxide, were dissolved in 75 cc. of methanol (boiled in the presence of nitrogen to remove oxygen). Nine grams of ferrous sulfate heptahydrate were dissolved in about 125 cc. of oxygen-free methanol. The ferrous solution was added quickly, with stirring and in the presence of an inert blanket of nitrogen, to the peroxide solution at −70° C. The solution turned red brown at once. The mixture was allowed to warm to 25° C. and then most of the methanol was removed on a steam cone. Two hundred grams of 10 per cent sodium hydroxide solution were added to the mixture, and the mixture was heated to boiling. The iron salts were filtered off and the alkaline filtrate was neutralized with concentrated hydrochloric acid. The resulting white precipitate was filtered off and dried overnight in air. The weight of dry solid was 1.87 grams of dibasic acid, which melted at 124° C., representing a yield of 49.3%.

*Example 9.*—The conditions employed in Example 8 were duplicated in three runs except that the initial temperatures employed were 0° C., 25° C., and 65° C., respectively. At 25° C., the temperature rise was about 10° C. Yields comparable to that obtained in Example 8 were obtained when operating at 0° C. and at 25° C., but somewhat lower yields were obtained at 65° C.

*Example 10.*—The conditions in Example 8 were repeated, except that the methanol was not freed of oxygen, as by boiling in the presence of nitrogen. Yields of less than 5 per cent were obtained.

*Example 11.*—The conditions of Example 8 were repeated, except that the peroxide solution was added to the ferrous solution. The yield was comparable to that obtained in Example 8, even when the peroxide solution was added slowly to the ferrous solution.

*Example 12.*—The conditions of Example 8 were repeated, except that the ferrous solution was added slowly, over a period of about one hour, to the peroxide solution. A very much lower yield was obtained than in Example 8.

*Example 13.*—Twenty-four grams of cyclopentanol containing 0.23 gram of benzoin and 0.46 gram of calcium carbonate (the latter as a fine powder in suspension) was blown with oxygen in a quartz tube in the presence of ultraviolet light for forty-two hours at 60° C. Analysis of this crude product indicated the peroxide constituent to be a mixture of hydrogen peroxide and cyclopentanone peroxide, and that conversion to total peroxide was about 12%. The crude product was freed of oxygen, dissolved in 100 ml. of oxygen-free methanol, and mixed under nitrogen with 11.25 grams of ferrous sulfate heptahydrate in 188 ml. of oxygen-free methanol at 26° C. The temperature rose to 33° C., and the solution turned reddish brown in color. The solution was evaporated to near dryness on a steam bath, and 50 ml. of 8% sodium hydroxide were added and the mixture warmed. The hot solution was then filtered, and the filtrate was cooled and extracted with 25 ml. of ether to remove unreacted cyclopentanol. The aqueous raffinate was then made acidic with concentrated sulfuric acid. A white precipitate formed, which was filtered off, washed with water and dried. Weight=0.79 gram. The product was recrystallized from water and identified as sebacic acid by melting point, mixed melting point, and neutral equivalent.

*Example 14.*—Four hundred grams of cyclohexanol were placed in a three-neck, fluted flask, equipped with a high-speed silver stirrer and a sintered-glass tube for introducing oxygen. The flask was irradiated with a 275 watt Westinghouse sun lamp, placed at such a distance that the temperature of the solution remained at 60–65° C. during the oxidation. After an induction period of about 5 hours, the peroxide content of the cyclohexanol rose and after 20 hours exposure reached a value of about 0.25 equivalent. The cyclohexanol was removed by distillation at 30–40° C. at 0.2–0.4 mm. of mercury, and the residual peroxide was diluted with methanol. This methanol solution was freed of oxygen by passing nitrogen thru it for 2 hours. The solution was then cooled under nitrogen to −78° C., and treated all at once with a deoxidized solution of ferrous sulfate in boiled methanol, also protected by nitrogen during preparation. The solvent was evaporated, the residue treated with water and alkali and the ferric hydroxide filtered off. The clear filtrate was acidified, and dodecandioic acid was recovered by filtration. After recrystallization from dioxane-water and alcohol-water, the product showed no depression of the melting point of an authentic sample.

*Example 15.*—Twenty grams of peroxide derived from cyclohexanone and hydrogen peroxide (M. P. 52° to 64.5° C.) were dissolved in 200 cc. of methanol. Eighty-five cc. of water were added rapidly to form a precipitate which was filtered and dried in a vacuum desiccator at 1 mm. pressure and ambient temperature. The yield of this peroxide was 64.5% by weight and it melted from 72.5° to 74° C. The active oxygen equivalent weight as determined by reaction with KI in glacial acetic acid was 64.1. Six and six-tenths grams of this peroxide dissolved in 150 cc. of substantially oxygen-free methanol were added to a stirred solution of 20 grams of $$FeSO_4 \cdot 7H_2O$$

in 200 cc. of substantially oxygen-free methanol over a period of 3.5 minutes with a temperature rise from 21° C. to 35.2° C. The resulting deep orange red solution was evaporated to dryness on a steam cone and the residue digested for 2 hours with 150 cc. of 30% KOH. The iron oxide was filtered off and the filtrate adjusted to a pH of 1 with 30% sulfuric acid. The solid acid precipitate, when filtered and dried to 100° C., weighed 4.85 grams, which represents a weight conversion of 74.5%. The melting range of the acid was 121° to 128° C., with a neutral equivalent of 116. X-ray diffraction patterns proved it to be 1-12 dodecandioic acid. Recrystallization of the crude acid prepared from the cyclohexanone peroxide gave a solid acid melting at 127.5–128° C. with a neutral equivalent of 115.

The foregoing examples show that the peroxides formed by the peroxidation of cyclohexanol or cyclopentanol, for instance, can be substituted for the reaction product of the cyclic ketone with hydrogen peroxide, and dibasic acids are obtained in analogous manner.

Since many different embodiments of the present invention will occur to those skilled in the art without departing from the spirit and scope thereof, it is not intended that the invention should be restricted in any way other than by the claims appended hereto.

I claim:

1. A process which comprises treating a peroxide compound having a cyclic structure consisting of from 4 to 10 carbon atoms in the primary ring, said peroxide being obtainable by reacting together hydrogen peroxide and a cyclic ketone of the formula

where R is a divalent radical containing from 3 to 9 carbon atoms in the unsubstituted portion of the radical, with a redox reducing agent, and separating a dibasic carboxylic acid from the resulting reaction mixture.

2. A process which comprises treating a peroxide compound having a cyclic structure consisting of from 4 to 10 carbon atoms in the primary ring, said peroxide being obtainable by reacting together hydrogen peroxide and a cyclic ketone of the formula

where R is a divalent radical containing from 3 to 9 carbon atoms in the unsubstituted portion of the radical, with ferrous ion as a reducing agent for said peroxide compound, and separating a dibasic carboxylic acid from the resulting reaction mixture.

3. A process which comprises treating a peroxide compound having a cyclic structure consisting of from 4 to 10 carbon atoms in the primary ring, said peroxide being obtainable by reacting together hydrogen peroxide and a cyclic ketone of the formula

where R is a divalent radical containing from 3 to 9 carbon atoms in the unsubstituted portion of the radical, with a redox reducing agent in the presence of ferrous ion, and separating a dibasic carboxylic acid from the resulting reaction mixture.

4. A process which comprises treating a peroxide compound having a cyclic structure consisting of from 4 to 10 carbon atoms in the primary ring, said peroxide being obtainable by reacting together hydrogen peroxide and a cyclic ketone of the formula.

where R is a divalent radical containing from 3 to 9 carbon atoms in the unsubstituted portion of the radical, with a redox reducing agent at a temperature of from −100° C. to 100° C., and separating a dibasic carboxylic acid from the resulting reaction mixture.

5. A process which comprises treating a peroxide compound obtainable by reacting together cyclopentanone and hydrogen peroxide, with a redox reducing agent, and separating sebacic acid from the resulting reaction mixture.

6. A process which comprises treating a peroxide compound obtainable by reacting together cyclopentanone and hydrogen peroxide, with a redox reducing agent in the presence of ferrous ion, and separating sebacic acid from the resulting reacting mixture.

7. A process which comprises treating a peroxide compound obtainable by reacting together cyclopentanone and hydrogen peroxide, with ferrous ion, and separating sebacic acid from the resulting reaction mixture.

8. A process which comprises treating a peroxide obtainable by reacting together cyclohexanone and hydrogen peroxide with a redox reducing agent, and separating dodecandioic acid from the resulting reaction mixture.

9. A process which comprises treating a peroxide compound obtainable by reacting together cyclopentanone and hydrogen peroxide with a redox reducing agent, and separating a dibasic carboxylic acid containing more than 5 carbon atoms from the resulting reaction mixture.

10. A process which comprises treating a peroxide obtainable by reacting together cyclohexanone and hydrogen peroxide with a redox reducing agent, and separating a dibasic carboxylic acid containing more than 6 carbon atoms from the resulting reaction mixture.

11. A process which comprises treating a peroxide compound having a cyclic structure consisting from 4 to 10 carbon atoms in the primary ring, said peroxide being obtainable by reacting together hydrogen peroxide and a cyclic ketone of the formula.

where R is a divalent radical containing from 3 to 9 carbon atoms in the unsubstituted portion of the radical, with a redox reducing agent, the peroxide compound and the reducing agent being mixed together rapidly, and separating a dibasic carboxylic acid from the resulting reaction mixture.

12. A process which comprises treating a peroxide compound having a cyclic structure consisting of from 4 to 10 carbon atoms in the primary ring, said peroxide being obtainable by reacting together hydrogen peroxide and a cyclic ketone of the formula

where R is a divalent radical containing from 3 to 9 carbon atoms in the unsubstituted portion of the radical, with a redox reducing agent, the peroxide compound and the reducing agent being dissolved in a common solvent before being brought into contact with each other and separating a dibasic carboxylic acid from the resulting reaction mixture.

13. A process which comprises treating a peroxide compound having a cyclic structure consisting of from 4 to 10 carbon atoms in the primary ring, said peroxide being obtainable by reacting together hydrogen peroxide and a cyclic ketone of the formula

where R is a divalent radical containing from 3 to 9 carbon atoms in the unsubstituted portion of the radical, with a redox reducing agent, said treatment being carried out in a continuous fashion by rapidly mixing the peroxide compound and the reducing agent in a tubular reactor under conditions of turbulent flow, and separating a dibasic carboxylic acid from the resulting reaction mixture.

14. A process which comprises treating a peroxide compound having a cyclic structure consisting of from 4 to 10 carbon atoms in the primary ring, said peroxide being obtainable by reacting together hydrogen peroxide and a cyclic ketone of the formula

where R is a divalent radical containing from 3 to 9 carbon atoms in the unsubstituted portion of the radical, with a redox reducing agent in the substantial absence of free oxygen, and separating a dibasic carboxylic acid from the resulting reaction mixture.

15. A process which comprises dissolving in substantially oxygen-free methanol a peroxide compound obtainable by reacting cyclopentanone with hydrogen peroxide, dissolving in substantially oxygen-free methanol a ferrous salt in an amount at least equivalent to the amount of said peroxide compound, rapidly mixing these two solutions at a temperature in the range of $-100°$ C. to $100°$ C., and separating a dibasic carboxylic acid containing more than 5 carbon atoms from the resulting reaction mixture.

16. A process which comprises dissolving in substantially oxygen-free methanol a peroxide compound obtainable by reacting cyclohexanone with hydrogen peroxide, dissolving in substantially oxygen-free methanol a ferrous salt in an amount at least equivalent to the amount of said peroxide compound, rapidly mixing these two solutions at a temperature in the range of $-100°$ C. to $100°$ C., and separating a dibasic carboxylic acid containing more than 6 carbon atoms from the resulting reaction mixture.

17. A process which comprises treating 1-hydroxy-1'-hydroperoxydicyclopentyl peroxide with a redox reducing agent, and separating a dibasic carboxylic acid from the resulting reaction mixture.

18. A process which comprises treating 1-hydroxy-1'-hydroperoxydicyclohexyl peroxide with a redox reducing agent, and separating a dibasic carboxylic acid from the resulting reaction mixture.

MILTON J. ROEDEL.

REFERENCES CITED

The following references are of record in the file of this patent:

UNITED STATES PATENTS

| Number | Name | Date |
|---|---|---|
| 2,298,405 | Milas | Oct. 13, 1942 |

OTHER REFERENCES

Milas et al.: J. Am. Chem. Soc., vol. 61, pp. 2430–2432 (1939).